(12) United States Patent
Ross

(10) Patent No.: US 11,541,330 B2
(45) Date of Patent: Jan. 3, 2023

(54) OILFIELD CENTRIFUGE DECANTER FOR DRILLING WASTE DRYING METHOD AND APPARATUS

(71) Applicant: RECOVER ENERGY SERVICES INC., Calgary (CA)

(72) Inventor: Stan Ross, Cochrane (CA)

(73) Assignee: RECOVER ENERGY SERVICES INC., Calgary (CA)

( * ) Notice: Subject to any disclaimer, the term of this patent is extended or adjusted under 35 U.S.C. 154(b) by 958 days.

(21) Appl. No.: 16/094,645

(22) PCT Filed: Apr. 18, 2017

(86) PCT No.: PCT/IB2017/052213
§ 371 (c)(1),
(2) Date: Oct. 18, 2018

(87) PCT Pub. No.: WO2017/182949
PCT Pub. Date: Oct. 26, 2017

(65) Prior Publication Data
US 2019/0336885 A1 Nov. 7, 2019

Related U.S. Application Data

(60) Provisional application No. 62/324,631, filed on Apr. 19, 2016.

(51) Int. Cl.
*B01D 12/00* (2006.01)
*B01D 21/26* (2006.01)
(Continued)

(52) U.S. Cl.
CPC .......... *B01D 12/00* (2013.01); *B01D 21/262* (2013.01); *B04B 1/20* (2013.01); *B04B 15/08* (2013.01);
(Continued)

(58) Field of Classification Search
CPC ........ B01D 12/00; B01D 21/262; B04B 1/20; B04B 15/08; B04B 2001/2091; E21B 21/066; E21B 21/06
(Continued)

(56) References Cited

U.S. PATENT DOCUMENTS 2,600,372 A * 6/1952 Milliken ............... B04B 1/2008
415/196
2,895,669 A * 7/1959 Bobo .................... E21B 21/065
494/10
(Continued)

FOREIGN PATENT DOCUMENTS

| | | | |
|---|---|---|---|
| GB | 2094676 A * | 9/1982 | ............... B04B 1/20 |
| WO | 91/08375 | 6/1991 | |
| WO | 92/05877 | 4/1992 | |

OTHER PUBLICATIONS

Alan Records et al., "Decanter centrifuge handbook", 1st edition, ISBN 1856173690, 2001, PP.
(Continued)

*Primary Examiner* — Charles Cooley
(74) *Attorney, Agent, or Firm* — Greenblum & Bernstein, P.L.C.

(57) ABSTRACT

A horizontal decanter centrifuge for enhanced recovery of drilling mud from drilling mud solids. Oilfield decanters will always suffer some drilling mud losses because they can only achieve a certain effectiveness with respect to solids dryness. The embodiment describes a process to mitigate the financial burden of drilling mud losses by adding a less expensive sacrificial fluid to take the place of drilling mud in the solids phase. A process and apparatus for drilling mud displacement is described including flowing the drilling mud into a horizontal decanter centrifuge, wherein the stresses imposed within the decanter act to force a sacrificial fluid to displace the drilling mud. The embodiment also describes a
(Continued)

process wherein vapours or mist are prevented from escaping and becoming airborne into the external atmosphere.

17 Claims, 7 Drawing Sheets

(51) Int. Cl.
  *B04B 1/20* (2006.01)
  *B04B 15/08* (2006.01)
  *E21B 21/06* (2006.01)
(52) U.S. Cl.
  CPC .... *E21B 21/066* (2013.01); *B04B 2001/2091* (2013.01)
(58) Field of Classification Search
  USPC .......................................... 494/23–30, 53–54
  See application file for complete search history.

(56) References Cited

U.S. PATENT DOCUMENTS

| | | | | |
|---|---|---|---|---|
| 2,928,546 A * | 3/1960 | Carrolle | ................ | E21B 21/065 210/319 |
| 2,955,753 A * | 10/1960 | O'conor | ................ | E21B 21/063 494/5 |
| 3,471,081 A * | 10/1969 | O'Conor | ................... | B04B 1/20 494/27 |
| 3,532,264 A * | 10/1970 | Clifford | ................... | B04B 1/20 494/6 |
| 4,190,194 A | 2/1980 | Amero | | |
| 4,654,022 A | 3/1987 | Shapiro | | |
| 5,156,751 A * | 10/1992 | Miller | ....................... | B04B 1/20 210/787 |
| 5,176,616 A * | 1/1993 | Schlip | ....................... | B04B 1/20 494/25 |
| 5,244,451 A * | 9/1993 | Retter | ....................... | B04B 1/20 494/10 |
| 5,509,882 A * | 4/1996 | Caldwell | ................... | B04B 1/20 494/29 |
| 5,653,673 A | 8/1997 | Desai et al. | | |
| 5,899,844 A * | 5/1999 | Eberle, Sr. | .............. | B04B 13/00 494/37 |
| 5,948,256 A * | 9/1999 | Leung | .................... | B04B 15/12 494/59 |
| 6,193,643 B1 | 2/2001 | Larsson | | |
| 8,287,441 B2 * | 10/2012 | Wick | ........................ | B03B 9/02 494/13 |
| 8,961,381 B2 * | 2/2015 | Walraven | .................. | B04B 1/20 494/37 |
| 10,238,994 B2 * | 3/2019 | Ross | ...................... | B01D 21/262 |
| 10,328,364 B2 * | 6/2019 | Ross | ........................ | B01D 21/01 |
| 10,731,428 B2 * | 8/2020 | Ross | ........................ | B01D 3/00 |
| 11,141,683 B2 * | 10/2021 | Ross | ................... | B01D 21/0045 |
| 11,199,063 B2 * | 12/2021 | Ross | ..................... | E21B 21/065 |
| 11,401,188 B2 * | 8/2022 | Yamashita | ............ | C02F 11/121 |
| 2005/0192173 A1 | 9/2005 | Grimwood et al. | | |
| 2010/0273628 A1 | 10/2010 | Onodera et al. | | |
| 2019/0336885 A1 * | 11/2019 | Ross | ........................ | B04B 1/20 |
| 2020/0340312 A1 * | 10/2020 | Ross | ..................... | E21B 21/066 |
| 2021/0355770 A1 * | 11/2021 | Ross | ....................... | B01D 33/76 |
| 2021/0363839 A1 * | 11/2021 | Al-Mousa | ............. | B01D 33/17 |
| 2021/0372209 A1 * | 12/2021 | Culver | ..................... | B03B 5/34 |

OTHER PUBLICATIONS

Official Communication issued in International Bureau of WIPO Patent Application No. PCT/IB2017/052213, dated Jul. 25, 2017.

* cited by examiner

OILFIELD CENTRIFUGE DECANTER FOR DRILLING WASTE DRYING METHOD AND APPARATUS

CROSS REFERENCE TO RELATED APPLICATIONS

The present application claims the benefit of U.S. Provisional Application No. 62/324,631 filed on Apr. 19, 2016, the disclosure of which is expressly incorporated by reference herein in its entirety.

TECHNICAL FIELD

The field of art to which this invention generally pertains is the management of drilling fluids, specifically the effective separation of the liquid and solid phases.

BACKGROUND

During the drilling of a well, for example for gas or oil, drilling mud is typically pumped down the drill string through a drill bit. The drilling mud simultaneously cools the bit and carries drill cuttings up the well bore. Drilling mud is typically comprised of a fluid (or fluids), and mixture of additives which can be either fluids or solids, forming a useable drilling fluid. Oil base drilling fluids are often used to drill oil and gas wells because they have special characteristics that make them a better cooling/carrying fluid than other drilling muds. Additionally, such drilling muds may offer better wellbore stability and/or lubricity for the drill string in modern, horizontal wellbores.

Typically, the drill cuttings which are carried up the wellbore are subjected to solids separating devices when the cuttings exit the wellbore, such as that of shale shakers or decanter centrifuges. These mechanical separators allow a substantial portion of the drilling mud to be returned to the storage tanks for reuse, while the drill cuttings portion is sent to separate storage tanks.

The drilling mud is a very important aspect of drilling efficiency. "Mud checks" are typically done daily to monitor rheology, viscosity, low gravity solids accumulations, among other parameters. Conditioning or drilling mud rehabilitation is subsequently ordered, to maintain or enhance the drilling mud performance.

With the evolution of new drilling technologies such as horizontal drilling, shale oil or shale gas fracking, and the increasing cost of drilling fluids, the ability to, and benefits of, recovering or enhancing drilling fluid would have clear benefits.

Accordingly, there is a constant search for new technologies and improvements to existing technologies to increase the efficiency and effectiveness of reclaiming and recycling processes.

BRIEF SUMMARY

A process for liquid phase-solids phase recovery of drilling mud is described including conveying the drilling mud as a slurry through a primary feed tube into a horizontal decanter centrifuge having a secondary feed tube and a bowl section containing a beach section, and separate the slurry into a liquids phase containing less solids phase and a solids phase containing less liquids phase, adding a sacrificial fluid through the secondary feed tube causing the sacrificial fluid to first contact the solids phase containing less liquids phase along the beach section of the bowl section causing the sacrificial fluid to permeate the solids phase and displace the liquid phase of the drilling mud, and ejecting the solids phase from the decanter centrifuge, resulting in enhanced separation and recovery of the drilling mud from the solid phase of the drilling mud prior to ejecting the solids phase from the decanter centrifuge.

Additional embodiments include: the process described above where the amount of sacrificial fluid added to the solids phase is greater than the sacrificial fluid addition calculation; the process described above where the amount of the sacrificial fluid added to the solids phase is less than the sacrificial fluid addition calculation; the process described above where amount of the sacrificial fluid added to the solids phase is equal to the sacrificial fluid addition calculation; the process described above where sacrificial fluid is added to prevent centrifuge plugging or aid in unplugging a centrifuge after it has become plugged; the process described above where the sacrificial fluid has a flashpoint of at least 61° C.; the process described above where the mixture of drilling mud and sacrificial fluid have a combined flashpoint of at least 65° C.; the process described above including discharging the solids phase from the horizontal decanter centrifuge where the solids phase discharged from the centrifuge contains a liquid phase consisting essentially of the sacrificial fluid; the process described above including discharging the solids phase from the horizontal decanter centrifuge, and where the solids phase discharged from the centrifuge contains a liquid phase comprised of less than 50% by volume of the sacrificial fluid; the process described above where the solids phase discharged from the horizontal decanter centrifuge contains a liquid phase comprised of less than 30% by volume of the sacrificial fluid; the process described above where the solids phase discharged from the horizontal decanter centrifuge comprises a liquid phase containing sacrificial fluid; the process described above including pre-treating and/or post-treating the drilling mud, separated liquid phase and/or solids phase, by solvent washing, additional decanter centrifuge separation, and/or solids drying; the process described above where the sacrificial fluid comprises more than 50% by volume of the same ingredients used as the liquid phase of the drilling mud; the process described above where the sacrificial fluid is heated to greater than 50° C. prior to the sacrificial fluid contacting the solids phase on the beach section; the process described above where the secondary feed tube is located along the outside of the primary feed tube; the process described above where the secondary feed tube is located opposite the primary feed tube; and the process described above where the sacrificial fluid is water and is chemically altered to cause the sacrificial fluid to have a surface tension equal to or less than 60 Dyne/cm, prior to conveying the sacrificial fluid onto the solids phase.

A process for liquid phase-solids phase separation of drilling mud is also described including conveying the drilling mud as a slurry through a primary feed tube into a horizontal decanter centrifuge containing a casket section and separating the drilling mud into a first liquids phase containing lesser amounts of solids and a second solids phase containing lesser amounts of liquids, where during the separation process vapor or mist is generated.

Additional embodiments include: the process described above where the separated solids phase is deposited onto a solids phase conveyor through a solids phase discharge outlet close coupled to the horizontal decanter centrifuge, wherein the solids phase is collected and conveyed away from the process while the vapour or mist travels through a torturous path allowing the vapor or mist to settle on the solids phase prior to the solids phase exiting the conveyor; the process described above where the solids phase outlet is close-coupled between the horizontal decanter centrifuge and the solids phase conveyor through a conduit which contains the vapour or mist generated by the horizontal decanter centrifuge; the process described above additionally containing a vapor or mist conduit adjacent to the solids phase discharge outlet which pulls the vapor or mist into the vapor or mist conduit by a vacuum generating close-coupled blower; the process described above where the vapor or mist is pulled into the vapor or mist conduit at a rate of about 10 CFM to about 1,000 CFM; the process described above where the vapor or mist generated by the horizontal decanter centrifuge is conveyed with an airstream passed through the vapor or mist to a knock-out tank, mist pad and/or carbon filter, prior to returning the airstream through a blower to the casket section of the horizontal decanter centrifuge, or area between the horizontal decanter centrifuge solids phase outlet and solids phase conveyor; the process described above where the knockout tank is also utilized as a sacrificial fluid storage tank; the process described above where the airstream is returned to the atmosphere after being conveyed through knock-out tank and/or mist pad and/or carbon filter, the process described above where the vapor or mist is collected by pulling the atmosphere including vapor or mist near the solids phase discharge outlet of the centrifuge through a hood connected to a mist pad, and/or carbon filter, the airstream conveyed by a close coupled blower, prior to returning the airstream to the atmosphere; the process described above where the airstream is conveyed by the close-coupled blower at a rate greater than 200 CFM and less than 4,000 CFM; the process described above where the vapor or mist is collected by pulling an atmosphere including the vapor or mist near the solids phase discharge outlet of the centrifuge through a hood connected to a mist pad and/or carbon filter, and where the atmosphere is pulled by a close coupled blower, and discharged into the atmosphere of a first flare tank, and/or degasser vessel, and/or mud tank, and/or shale shaker, and/or drilling waste storage equipment; and the process described above where the atmosphere is being conveyed by the close-coupled blower at a rate greater than 200 CFM and less than 4,000 CFM.

These and additional embodiments are further described below.

DETAILED DESCRIPTION

Figure 1:
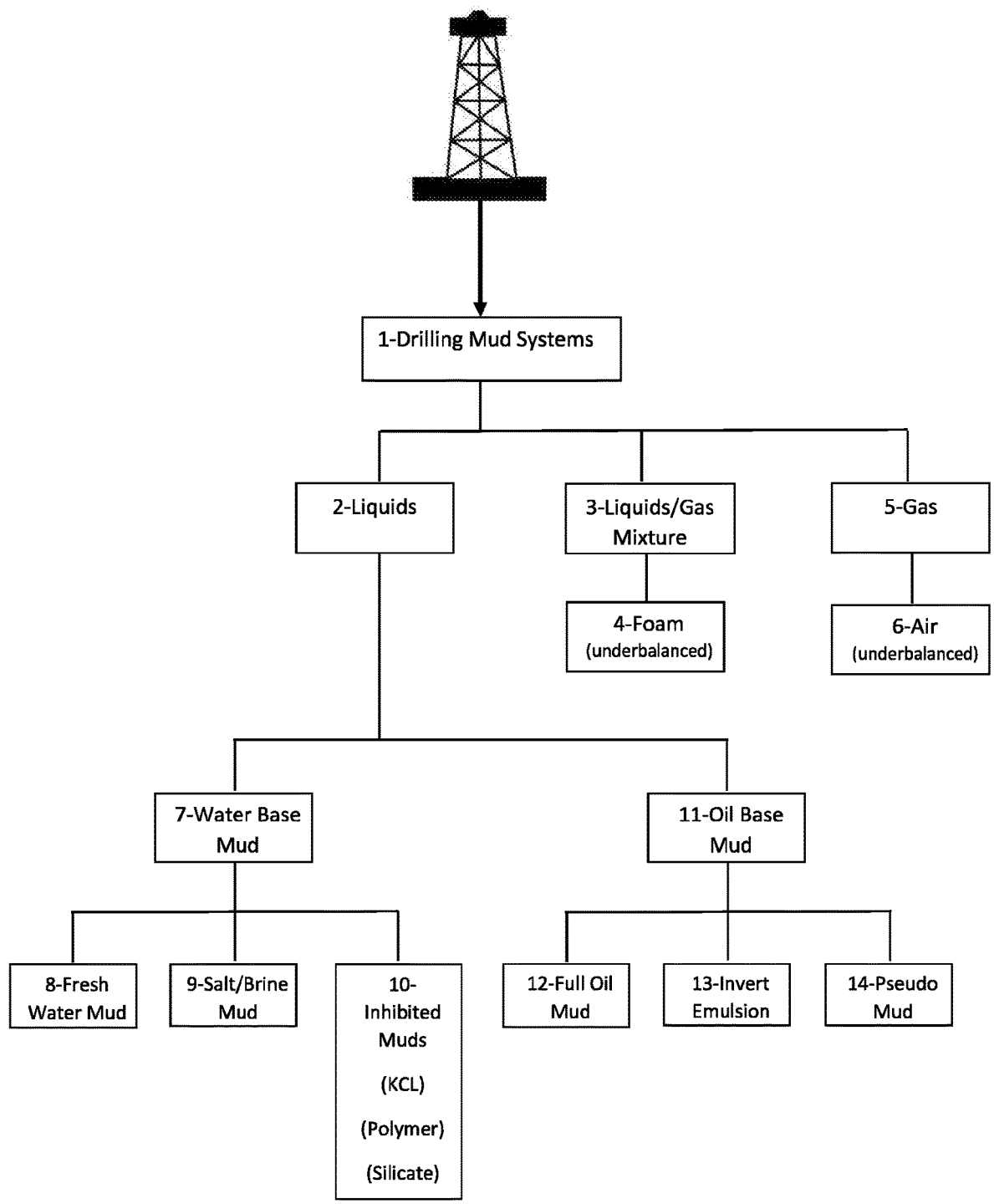
FIG. 1 is a flow chart of different mud systems used while drilling.

The particulars shown herein are by way of example and for purposes of illustrative discussion of the various embodiments of the present invention only and are presented in the cause of providing what is believed to be the most useful and readily understood description of the principles and conceptual aspects of the invention. In this regard, no attempt is made to show details of the invention in more detail than is necessary for a fundamental understanding of the invention, the description making apparent to those skilled in the art how the several forms of the invention may be embodied in practice.

The present invention will now be described by reference to more detailed embodiments. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are expressly incorporated by reference in their entirety.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Every numerical range given throughout this specification will include every narrower numerical range that falls within such broader numerical range, as if such narrower numerical ranges were all expressly written herein.

Additional advantages of the invention will be set forth in part in the description which follows, and in part will be obvious from the description, or may be learned by practice of the invention. It is to be understood that both the foregoing general description and the following detailed description are exemplary and explanatory only and are not restrictive of the invention, as claimed.

The following terminology is included for ease of understanding:

Drilling fluid—used in the drilling industry to carry the solids phase (rock, clay, shale, etc.) broken up by the drill bit out of the well bore so that it can be discarded as drilling waste. Drilling fluid (or drilling mud) consists of a base fluid with additives which can include liquids or solids or both, which give the drilling fluid properties necessary for effective use as a drilling fluid.

Low Gravity Solids—(LGS) are typically less than 20 microns in size and consist of drilling mud additives or formation solids. Formation solids begin as larger drill cutting pieces for example, as large as 2 centimeters in diameter, of which a portion of the larger pieces become broken or ground down to less than 20 microns by the time they arrive at surface.

Oil based mud—(OBM) also known as Invert, is a type of drilling fluid that uses oil as the base ingredient and it typically consists of a mixture of oil, emulsified water and drilling mud additives which might be solids or liquids or both.

Water based mud—(WBM) is a drilling fluid that uses water as the base ingredient, mixed with liquids or solids or both. Common water base muds are known as gel-chem mud systems, brine mud systems or polymer mud systems.

Viscosity is best understood as the thickness of a fluid. For example, water has relatively low viscosity, whereas a milkshake has a higher viscosity.

Rheology is the science of explaining liquid flow. One of the important rheology properties of drilling mud is the 'yield point', or the carrying capacity of the fluid. A small solid dropped in a glass of water demonstrates a fluid with no yield point, because the small solid will drop regardless of its size. The same size solid in a milkshake may not drop at all because the force of gravity may not be strong enough to break the yield point of the milk shake. If it is heavy enough to exceed the yield point of the fluid it will drop more slowly than the same size solid in water due to the higher viscosity of the milk shake. Drilling mud is typically modeled as a Bingham plastic. Bingham Plastics are liquids that behave like a solid, up to a particular amount of shear stress, when they behave more like a liquid than a solid; this is known as the yield point of the fluid.

Apparatus and methods are described to reduce the volume of drilling fluid lost to the solids phase while centrifuging an active mud system, by adding a sacrificial fluid (depending on the drilling fluid being used, such as diesel or diesel like fluid, base oil, water, brine water, etc., as further described below) to the recovered solids phase while the recovered solids phase (sometimes called the "cake") is on the beach section of the horizontal decanter centrifuge, and being mechanically separated from the liquids phase. Also see, copending, commonly assigned U.S. patent application Ser. No. 62/303,163, the disclosure of which is herein incorporated by reference, which discloses the use of a diluent to facilitate washing (with a rinse feed tube) within a gas tight decanter.

During the drilling of a gas or oil well, drilling mud is typically pumped down the drill string through a drill bit to simultaneously cool the bit and carry drill cuttings up the well bore. Drilling mud is typically comprised of a fluid (or fluids), and mixture of additives which can be either fluids or solids, forming a useable drilling fluid.

The drilling mud comprising the active mud system is a very important aspect of drilling efficiency. "Mud checks" are typically completed daily to monitor rheology, viscosity, low gravity solids accumulations, among other parameters. Conditioning or drilling mud rehabilitation is subsequently ordered, to maintain or enhance the drilling mud performance.

As illustrated in FIG. 1, there are many types of drilling mud systems (1), including many types of drilling fluids including liquids (2), liquid/gas mixtures (3), including foam (4) and gas (5), including air (6). The liquids include water based muds including fresh water muds (8), salt (brine) muds (9), and inhibited muds (10) such as KCl (potassium chloride), polymer, and silicate. Liquids also include oil based muds (11) including full oil muds (12), invert muds (13), and pseudo muds (14), among others. The primary difference between drilling fluids is the base ingredient. Gas (or air) based systems are cost effective because (notwithstanding air is free), they allow for extremely fast drilling by blowing the drilled solids out of the well and allowing the drill bit to remain clear of debris. However, they are seldom used because the presence of formation liquids causes "air drilling" to immediately stop working. Water base drilling fluids are typically used for non-technical well profiles because the base product (water) is typically very inexpensive. However, most shales (or compact clays) are hydrophilic (meaning they absorb water as opposed to hydrophobic, meaning they reject water), so drilling with a water based product can cause problems for the well operator, leading to expensive downtime. While oil base drilling fluids can require a significant capital investment, they are often used to drill oil and gas wells because they have special characteristics that make them a better cooling/carrying fluid than other drilling muds. Additionally, such drilling muds may offer better wellbore stability and/or lubricity for the drill string in modern, horizontal wellbores.

The use of salt (water based) or emulsion (oil based) mud systems typically cost "x", and by the time the operator of the well has conditioned the mud by adding additives, for example, emulsifiers, lubricants, weighting agents or fluid loss chemicals, the cost of the mud system can be 40% greater than "x". For example, to generate a cube of brine (salt) mud, one would purchase a cube of brine water and add additives to create brine mud. One would expect the cost of a 1280 kg (kilogram) brine water to be, for example, approximately $400 per 1000 liter (delivered to a drill site). The cost of additives would bring the total cost of each cube of brine mud up to about $750 per 1000 liters. The cost of oil base muds fluctuate with the cost of a barrel of oil, or the grade/type of oil base the operator is using to build the oil base mud. Generally speaking, with oil prices between, for example, $30 and $40 per barrel, the cost of oil base would be approximately $500 per cube (delivered to a drill site), and with the cost of additives to build a 1280 kg (kilogram) drilling mud, the total cost would likely be greater than, for example, $850 per 1000 liters. Using averages of each and considering the generality of the values used, one could estimate a base product is $450 per cube and a weighted drilling mud is $800 per cube. For the purposes of this example, and considering the costs offered can vary from region to region, the cost of the base product prior to conditioning is little more than half of the total cost of a weighted drilling mud.

With the significant cost of drilling muds, there has been a great deal of research and development to most effectively recover as much of the drilling mud as possible, by using solids separating devices or fluids rehabilitation devices.

Onsite solids control systems include shale shakers, centrifugal dryers or centrifuges while offsite liquids recovery systems generally consist of thermal extraction systems or diluent washing systems.

Typically, the drill cuttings which are carried up the wellbore by the drilling mud are passed over a shale shaker (s) to remove a substantial portion of the drilling mud. Shale shakers are considered the first line of defence on a drilling rig, for recapturing drilling fluid that would otherwise be lost to the drill cuttings. They are a highly effective mechanism for bulk liquids recovery and very inexpensive when compared to other conventional forms of solids control, like that of centrifuges for example. While all shale shakers operate on the same basic principal, they do come in a variety of models, which offer differing gravitational forces, coarse to very fine screen sizes, differing vibratory motions, and as few as one screen, or as many as four, on one or more screen bed elevations.

Shale shakers apply force, usually measured in terms of gravitational forces, ranging between four to eight times greater than earth's gravity. The principals behind a vibratory screen is to create a bed where the solids and liquids phase "bounce", causing the liquids phase to yield under the stresses of the gravity and shaker forces. The yield point is the point where the (Bingham Plastic) liquids phase transitions from behaving like a solid, to acting as a liquid. Acting as a liquid provides an opportunity for the liquids phase to be thrown from the solids phase, and drop through the low micron screen of the vibratory bed. The liquids phase can then be returned directly to a processing tank, or be collected in an attached hopper or hose, and redirected to another process such as that of centrifuges, hydro cyclones, or membranes, for further fluids rehabilitation. Additional fluids rehabilitation is required because conventional shale shakers are a good mechanism to remove a substantial amount of liquids from the solids. However, this fluid typically contains small micron, high or low gravity solids that would otherwise travel through the porosity of the vibratory screen, rather than be caught on the upper side of the screen with the larger solids. Typically, shale shakers are only effective at obtaining a drill cuttings dryness of 10% to 25% by weight.

Centrifugal dryers (also known as vertical cuttings dryers or Verti'G's) are sometimes employed to recover more drilling mud than a shale shaker is capable of. Verti-G's are generally capable of producing a cuttings dryness of 5% to 25% by weight. However, the liquids phase recovered in a Verti-G is in need of substantial fluids rehabilitation. Regardless of the mechanical separation method employed, for example, a shale shaker, the accepted and effective method of low gravity solids removal from the drilling mud is to employ a horizontal decanter centrifuge.

Horizontal decanter centrifuges are commonly used to remove the low micron solids that otherwise pass through the shale shaker screens. A typical drill site decanter can exert gravitational forces in excess of 1000 times that of Earth's gravity, and as much as 3000 times Earth's gravity force. These forces are capable of removing substantial volumes of low gravity solids, also known as drilled solids, before the low micron/low gravity solids volume can accumulate and become problematic to the drilling operation. Decanters have many designs and operating parameters including shorter or longer beach lengths for example, or shallow or deeper weir settings to facilitate longer fluids retention or a dryer solids discharge. It is up to the designers and operators of the decanter to balance the operating parameters against the specific needs of the drill site.

As drilling mud is fed into a rotating horizontal decanter-type centrifuge, the centripetal forces exerted by the rotating bowl force the solids phase to the inside surface of the bowl. The centripetal force on the solids phase increases with the rotational speed of the bowl. At sufficient rotational speed, the centripetal forces on the solids phase will be high enough to overcome the yield strength of the fluid and the large solids will tend to shed fluid at a rate that is slowed by the viscosity of the fluid. If the rotational acceleration of the bowl is not fast enough, the centripetal force on the smallest solid particle within the drilling mud will not be high enough to break the yield strength of the drilling fluid and the low micron solids will remain in the fluid regardless of how long the fluid remains in the decanter. But if the rotational acceleration of the bowl is high enough to apply a sufficient centripetal force on the smallest solids within the drilling mud for it to break the yield strength of the fluid, the smallest solids will sink within the fluids. The rate they sink at is governed by Stokes' law which predicts that a particle will sink (or float) and accelerate up to the speed (terminal velocity) where the exerted forces causing the particle to move are equal to the viscous (or drag) forces that oppose the motion.

Figure 2A:
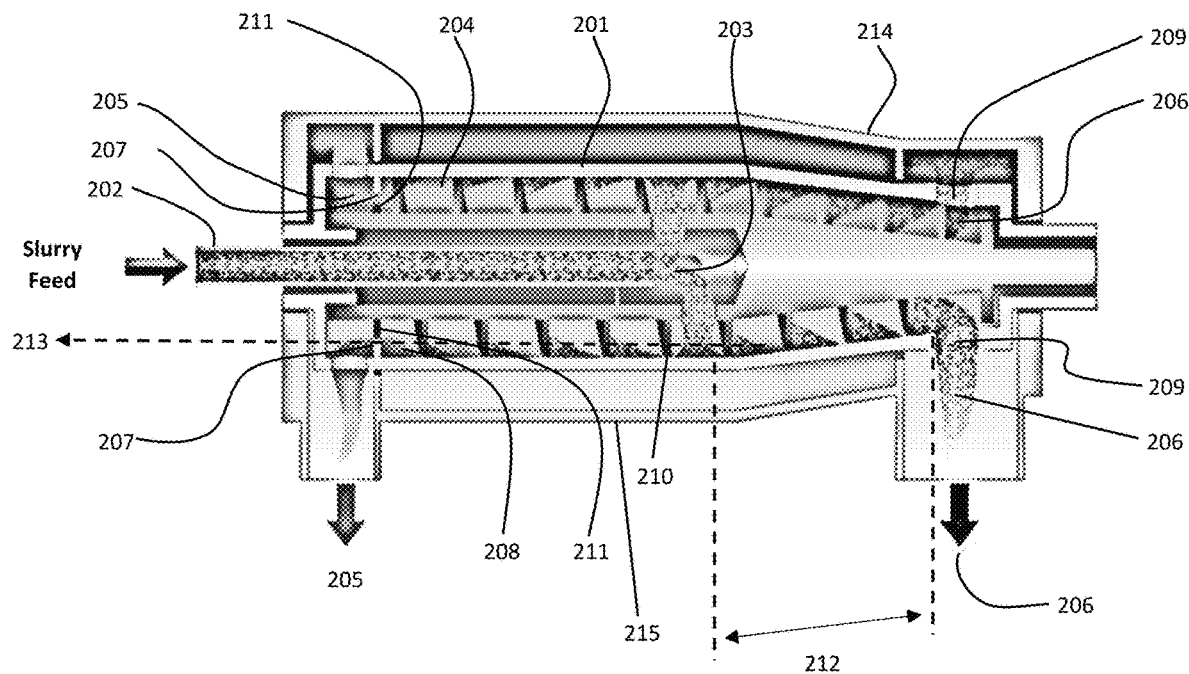
FIG. 2A is an illustration of the inner workings of a typical horizontal decanter embodiment and how the slurry can transition to a liquids phase and solids phase.

FIG. 2a illustrates a typical horizontal decanter layout. As shown, this arrangement depicts one of the two ends where a feed tube (202) can enter the bowl section (201) and where the liquids phase (containing lesser solids) (205) and solids phase (containing lesser liquids) (206) exit the bowl section (209).

Figure 2B:
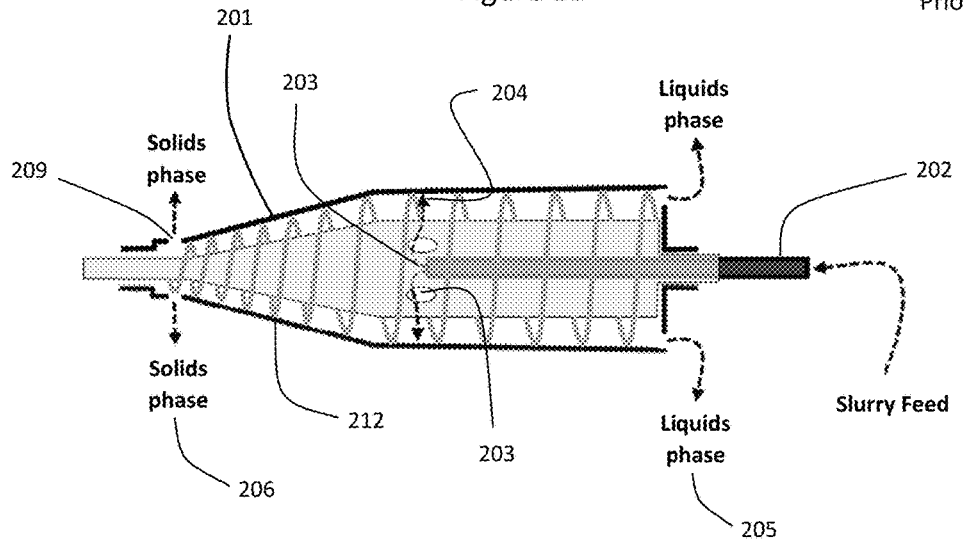
FIG. 2B is a line drawing of the inner workings of a typical horizontal decanter embodiment.

FIG. 2b is a simplified line drawing illustration of FIG. 2a, demonstrating the process, solid phase and liquids phase of a typical decanter centrifuge. The illustration shows the bowl section (201) of the decanter is rotating such that when the slurry exits (203) the feed tube (202), it comes to rest along the outer most inside edge (204) of the large bowl. There, gravitational forces are exerted on the solids such that the yield strength of the liquids phase (205) will be overcome and begin to separate from the solids phase (206). The solids being heavier will be forced to the inside surface of the bowl and the liquid level (208) inside the bowl will rise until it reaches the level of the adjustable weir (207). The weirs are located at the opposite end of the decanter to the solids ports (209). The maximum liquid level inside the bowl is set by the adjustable weirs. Liquid will overflow the weir at a flow rate that is proportional to both the wet cuttings feed rate and to the wetness of the feed. The scroll (210) sweeps separated solids (206) to the opposite end (when compared to the liquids overflow). The scroll (210) rotates inside the bowl (201) on an axis concentric to the bowl. The scroll is, essentially, a flited auger that it is designed to move the separated solids axially within the bowl away from the liquid outlets (211) toward the solids outlet ports (209). If the rotational speed of the scroll is the same as the bowl, solids are not transported, but if the scroll rotates at a slightly different speed the solids can be swept along the inside surface of the bowl toward the solids outlet end. The bowl and the scroll are tapered nearer the solids outlet end of the bowl to provide a tapered beach section, which is commonly called "the beach" (212). As solids are pushed along and up the beach they rise above the liquid level (213), set by the adjustable weir height (207), before they reach the solids outlet ports (209). At this point, any liquids entrained with the solids will tend to flow back down the tapered beach section (212) as the solids are lifted above the liquid level (213) by the scroll (210), thereby draining the solids of liquids before they are swept out of the bowl through the outlet. The mechanical process employed by a horizontal decanter centrifuge of separating the liquids phase and solids phase is done so within the inner boundaries of the casket lid section (214) and casket body section (215), to prevent the egress of the liquids phase or solids phase by any means other than the intended inlet or outlet ports.

The drawback of horizontal decanter centrifuges is that the solids phase discharged from the decanter can still contain substantial volumes of expensive drilling mud due to surface adhesion on the solids phase, the drilling mud occupying the porosity of the solids phase, and drilling mud filling the voidage (spaces between) of the solids phase. The drill cuttings consisting of a liquids phase (drilling mud) and solids phase (drill cuttings) is known as drilling waste and is stored in onsite storage tanks, stabilized with a bulking agent and transported to landfill for disposition. Accordingly, there exists a need to remove a substantial portion of the oil on discarded drilling waste.

The process and apparatus disclosed herein utilizes a horizontal decanter centrifuge to simultaneously separate the components of a slurry into a first solids phase with a lower liquids content, and a second liquids phase with a lower solids content, while producing a dryer solids phase than accomplished by prior designs. The process and apparatus described herein include the use of a sacrificial fluid to facilitate a displacement of expensive drilling mud with a lower cost fluid.

In an effort to maximize the removal of drilling fluid from the cake, sacrificial fluid can be added at another location in the decanter, such as on the beach section (near where 212 & 213 intersect) between the liquid interface level (the "pond") and the solids outlet port, to facilitate a rinsing method in addition to the previously described embodiment of the centrifuge washing method. A like theory and design is discussed in section 2.3.6.4 & section 2.3.8.2 of the Decanter Centrifuge Handbook (first edition) by Alan Records and Ken Sutherland, the disclosure of which is herein incorporated by reference in its entirety. The handbook explains that a "rinse" or "flocculent" can be delivered via a separate, secondary rinse feed tube to help remove suspended solids from the liquid phase by causing the solids to be attracted to one another, thereby increasing the density of the solids. While a flocculent mixed with the sacrificial fluid would not necessarily be detrimental to the embodiment described herein, the addition of a flocculent would be less practical (if not ineffective) because the embodiment disclosed herein is one of fluid loss acceptance and cost mitigation, whereas a flocculent causes solids to coagulate together, thereby increasing the density so they can settle more quickly in a viscous fluid.

As described herein, the process includes conveying the drilling mud into a horizontal decanter centrifuge, where at least one sacrificial fluid is added to the apparatus by means of a separate conduit or feed tube into the bowl section, separate from the primary feed tube, which is delivering the drilling mud. The apparatus is designed such that the two liquids phases (drilling mud and sacrificial fluid) are not intended to be uniformly mixed but rather, ideally, permit the lessor cost sacrificial fluid to displace the more expensive drilling mud fluid from occupying the discarded solids phase/drilling waste.

By design of the secondary feed tube, the sacrificial fluid must first come in contact with the cake occupying the beach section of the horizontal decanter centrifuge, to displace the more valuable drilling fluid, along the beach section.

Cake compaction along the beach section is achieved by the rotational speed of the bowl and subsequent gravitational forces exerting pressure on the cake, squeezing the expensive drilling mud from the solids phase where it can flow back into the pond section. Given compaction will already be occurring along the beach section, a slight disturbance of the cake as it conveys up the beach section would be advantageous to the process because the fracture of the cake would permit migration of the sacrificial fluid into the cake, thereby displacing or diluting the expensive drilling fluid.

To increase the dryness of the cake, or to increase the low gravity solids (LGS's) separation rate, or to reduce the cost of valuable drilling mud, or all of the foregoing, would be to add a fluid into to the sacrificial feed tube. The sacrificial fluid must be chosen for its specific characteristics, but generally the following fluids characteristics as shown in Table 1 are desired:

TABLE 1

| Oil base (Invert) mud | Water base mud |
| --- | --- |
| will quickly dissolve into oil base drilling mud; or, | will quickly dissolve into water base drilling mud; or, |
| is actively miscible with the residual drilling mud that is surface absorbed on the cake, occupying the voidage of the cake, or porosity of the cake; and, | is actively miscible with the residual drilling mud that is surface absorbed on the cake, occupying the voidage of the cake, or porosity of the cake; and, |
| a fluid or mixture of fluids where greater than 50% of the constituents of the fluid or mixture of fluids have a normal boiling point of 250° C. or greater; or, | a fluid or mixture of fluids where greater than 50% of the constituents of the fluid or mixture of fluids is water, saline water or produced (waste) water; |
| a fluid or mixture of fluids wherein greater than 50% of the constituents of the fluid or mixture of fluids is commonly known as diesel fuel; or, | |
| a synthetic base oil commonly manufactured for use in an oil base mud system; or, | |
| a distillate base oil, commonly manufactured for use in an oil base mud system; | |

TABLE 1-continued

| Oil base (Invert) mud | Water base mud |
|---|---|
| and, the sacrificial fluid has a flash point sufficiently high such that when the solids phase (cake) is discharged from the centrifuge it has a flash point greater than 61° C. | and, the sacrificial fluid has a flash point greater than 61° C. or the sacrificial fluid has a flash point sufficiently high such that when the solids phase (cake) is discharged from the centrifuge it has a flash point greater than 61° C. |
| and, the sacrificial fluid has a flash point sufficiently high such that the volume of sacrificial fluid that inadvertently becomes mixed with the drilling mud is not sufficient to cause the drilling mud to have a flash point of less than or equal to 65° C. at the moment the drilling mud leaves the centrifuge; | and, the sacrificial fluid has a flash point sufficiently high such that the volume of sacrificial fluid that inadvertently becomes mixed with the drilling mud is not sufficient to cause the drilling mud to have a flash point of less than or equal to 90° C. at the moment the drilling mud leaves the centrifuge;; |

While the sacrificial fluid should bear the aforementioned properties, it is also advantageous to utilize a fluid which would be readily available to the remote drill site. Ideally, utilizing the same base fluid as is used in the mud system, for example, water or waste water for a Water base drilling mud, or base oil or diesel fuel for an Invert mud system, would have advantages because such fluids are already available on the drill sites. While diesel fuel and base oil are highly similar by composition, the use of diesel fuel is not permitted in some jurisdictions due to vapor pressure, flash point. BTEX constituents, etc. (benzene, toluene, ethylbenzene and xylene, commonly known to be toxic solvents that are abbreviated, BTEX). However, the use of diesel fuel would sufficiently displace the drilling mud and bind to the solids phase (which is ultimately destined for disposal) and trace amounts of diesel which happen to leach into the pond section and mix with the oil mud system would have no measurable negative impacts on the drilling mud system for example, yield point, plastic viscosity or density, beyond the expected results of utilizing a horizontal decanter centrifuge.

The amount of sacrificial fluid required to facilitate an effective displacement of the drilling mud is not a random or unlimited volume. In fact, too much sacrificial fluid can cause slippage of the solids phase on the incline of the beach section. In order to ensure the solids phase isn't "slipping" (sliding back down the beach section), the sacrificial fluid additions should be limited, based on three factors:

Voidage—the spaces between the drill cuttings particles that is otherwise occupied by residual OBM and diluent, (or in limited cases, gaseous airspace)

Absorption—the volume of liquids absorbed by the drill cuttings as they are conveyed from the pond onto the beach section Porosity—the empty spaces, holes or fractures within the cuttings particles (which are typically naturally occurring)

The calculation for sacrificial fluid additions is obtained by dividing the bulk density into the density of the processed drill cuttings (for a voidage value) and adding the volumetric values of absorption and porosity, multiplied by the production rate of processed drill cuttings. When the latter two are unknown, the voidage calculation presumes the surface absorption and porosity values in the processed drill cuttings are greater than zero. The calculation for an effective sacrificial fluid volume is further illustrated in Table 2 below.

TABLE 2[1]

| | Weight | Volume | Calculation | Result |
|---|---|---|---|---|
| Solids Particle Density (in its natural/compressed state) | 2.65 kilograms | 1 litre sample | Weight/Volume 2.65/1.0 = 2.65 | Density = 2.65 (Kg/L) |
| Dry Solids Bulk Density (in its processed state) | 1.7 kilograms | 1 litre sample | 1.7/1.0 = 1.7 | Density = 1.7 (Kg/L) |
| Porosity of particles (presumed greater than 0 and given a value of "X") | | | X (volume) | Volume = X |
| Surface Absorption (presumed greater than 0 and given a value of "Y") | | | Y (volume) | Volume = Y |
| Sacrificial fluid volume[2] (SFV) | | | Calculation SFV = {1 − (1.7/2.65) + X + Y} multiplied by (the production rate of the solids phase exiting the decanter) | |

Note 1
The values in the table are for illustrative purposes only and do not necessarily reflect expected or measured parameters of the horizontal decanter centrifuge Note 2
Sacrificial fluid volume is the fluid required for an effective displacement of expensive drilling mud, and proportional to the volume of processed solids leaving the solids phase of the horizontal decanter centrifuge As described in U.S. Pat. No. 4,654,022 (the disclosure of which is herein incorporated by reference) the compaction of the cake can cause a rinsing fluid to pass over the compacted cake and have less of a desired effect. As such, the document describes the use of hollow-flights with holes along the face of the flights. As rinse fluid is added through the rinse tube and the rinse fluid enters the hollow-flights of the scroll section and causes the rinse fluid to permeate into the cake section, by gravitational diffusion. The option disclosed within U.S. Pat. No. 4,654,022 is complex to build, susceptible to high density/low micron solids, plugging the rinse fluid outlet orifices, and undue wearing around the orifices, due to the abrasiveness of low micron drilled solids.

In an effort to maximize the benefits of adding a sacrificial fluid, by ensuring the sacrificial fluid can permeate into the solids cake, some options include:

1) utilizing a large bowl decanter so that the drilling mud slurry is subjected to high gravity forces for a longer period of time, and/or
2) deliberately fracturing the cake during conveyance along the beach section to create an artificial/temporary porosity, and/or
3) adding a sacrificial fluid with properties that promote diffusion of the sacrificial fluid into the cake.

Utilizing a large bowl decanter is advantageous in that the drilling mud slurry is subjected to high gravitational forces which are lower than that of smaller diameter bowl designs. Larger bowl designs typically feature slower rotating bowl sections, with longer retention time for the drilled solids to be removed from the slurry. Large bowl design has a benefit of less force/compaction of the solids phase which is advantageous to sacrificial fluid diffusion.

Figure 5A:
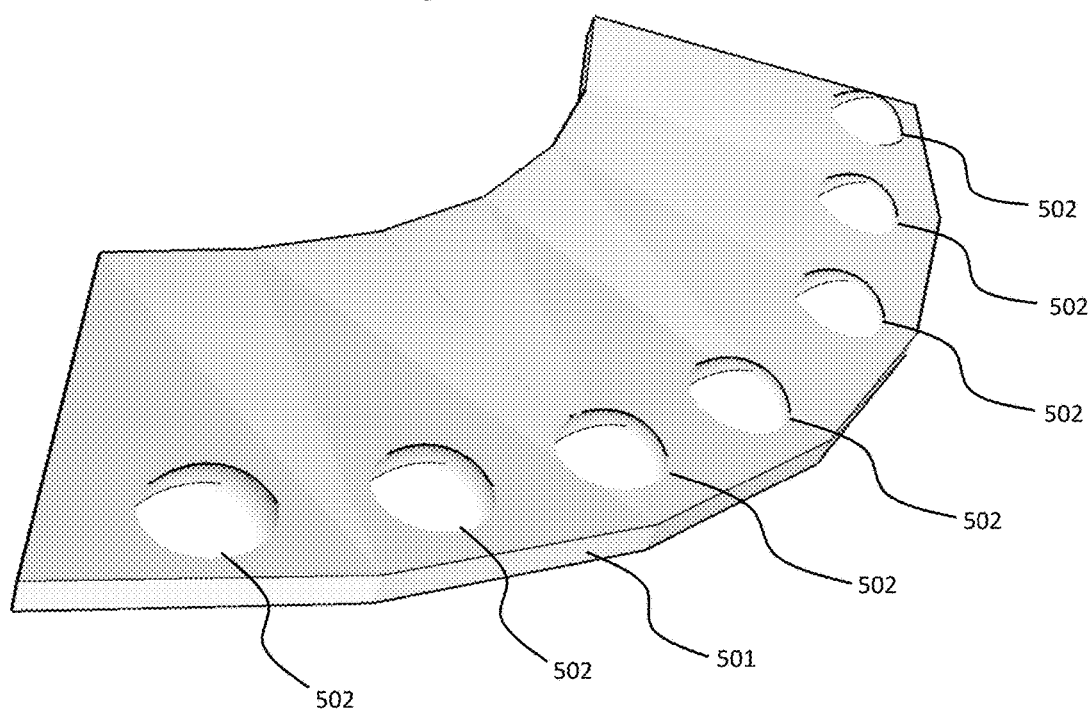
FIG. 5A and 5B illustrates the induction of a fracture of a cake by utilizing uneven tiles or dimples on the face of a decanter scroll.
Figure 5B:
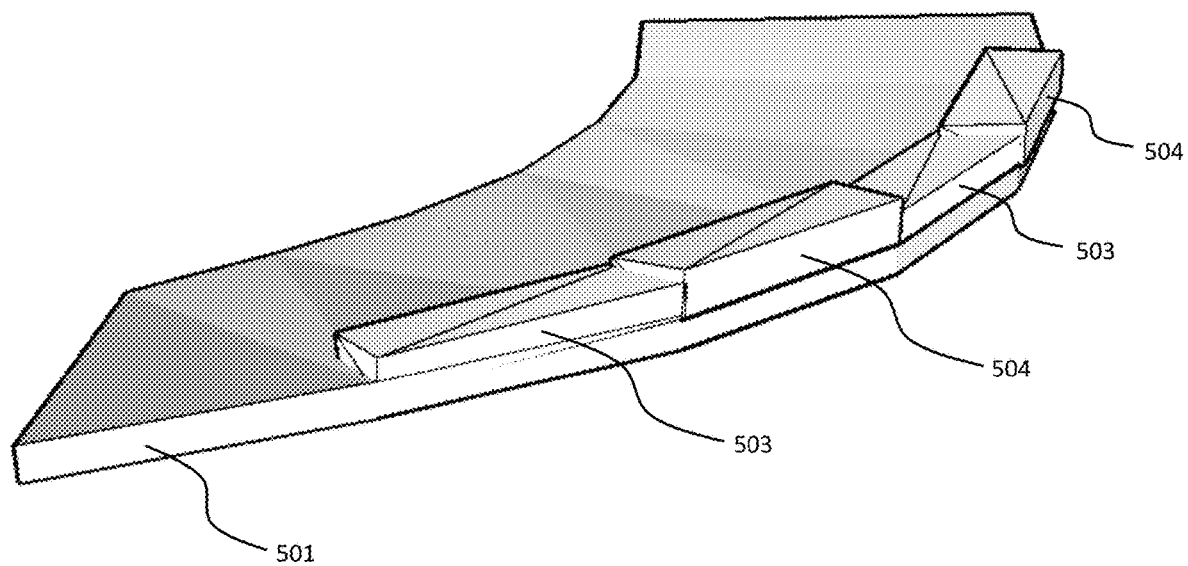

Deliberately fracturing the cake can be accomplished by adding uneven, or dimpled tiles to face of the scroll section, as illustrated in a cut out of the scroll section of FIGS. 5a and 5b. Typically the scroll section (501) of a horizontal decanter centrifuge is built with smooth, high abrasion wear strips called tiles, which are manufactured of exotic metals for durability, for example tungsten steel. To add concave (not shown) or convex dimples (502) to the face of the scroll section, or incorporate thinner (503) and thicker (504) tiles to create an uneven surface on the scroll section (501), or combination of both, would cause the conveyance of the cake to become less predictable and thus cause artificial fractures in the cake, creating porosity for the sacrificial fluid to enter the cake and displace the more expensive drilling fluid back into the pond section.

The addition of a less viscous sacrificial fluid is advantageous because a less viscous fluid is more likely to permeate the porosity of a cake than a higher viscous sacrificial fluid. Specifically, if oil base mud is the active mud system, it would be advantageous to use diesel or base oil, already common as the base fluid in the drilling mud, and to artificially heat the diesel or base oil would substantially lower the viscosity of the sacrificial fluid. Table 3 demonstrates the effects of heating the sacrificial fluid (diesel) to reduce the viscosity. For example, an active OBM system with a typical temperature of 25° C. would have a viscosity of 2.7 centipoise (cP) whereas to heat the sacrificial fluid to 75° C. would reduce the viscosity 2.5 times. While the numbers in the Table 3 are demonstrated for diesel, because base oil is so close in makeup to diesel, the results demonstrated would be approximately the same result for base oil as well.

TABLE 3

| Diesel temperature | Viscosity (cP) |
| --- | --- |
| 25° C. | 2.72 |
| 50° C. | 1.7 |
| 75° C. | 1.06 |
| 100° C. | 0.89 |

The technique of using a sacrificial fluid to displace another more valuable fluid can be found in mature oil producing formations where the pressure of the formation is lower or insufficient to cause the oil to permeate to the wellbore where it can be extracted. Water is pumped into a wellbore and down to the target formation to cause residual oil in the formation to be displaced towards another wellbore where it can be extracted. Commonly known as water floods, water is used as a sacrificial fluid to extract valuable hydrocarbons. However, in the case of liquid-liquid displacement within a formation, the lower viscosity liquid will flow more easily than the higher viscosity liquid. Thus, oil producers are cognizant of 'fingering', which is the effect of water (having a lower viscosity than oil), flowing past the higher viscosity oil, which is counterproductive to injecting water into the oil producing formation.

As can be seen in Table 4, temperature affects the viscosity of water. However, given water already has a low viscosity, raising the temperature of water would not provide the same benefits as that of raising the temperature of oil for example. Surface tension describes the forces that exist between the molecules of a liquid; higher surface tension means that the molecules of the liquid tend to stay together whereas lower surface tension means that the liquid has a greater tendency to spread apart. Thus, to reduce water's surface tension on the cake would be to add a surfactant to chemically alter the surface tension of the water, thereby providing the water with an enhanced ability to permeate the voidage of the cake.

TABLE 4

| Water temperature | Viscosity (cP) | Surface Tension (Dyne/cm) |
| --- | --- | --- |
| 25° C. | 0.89 | 75.64 |
| 50° C. | 0.53 | 71.97 |
| 75° C. | 0.37 | 67.91 |
| 100° C. | 0.28 | 58.85 |

Figure 3A:
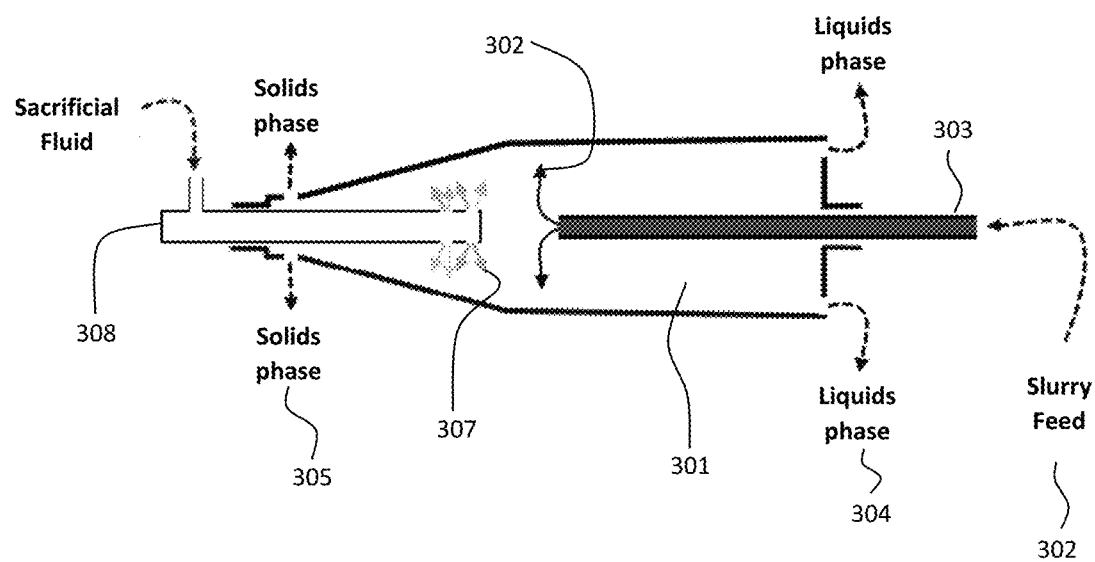
FIGS. 3A, 3B, 3C and 3D show various representative designs for a primary feed tube and a secondary (sacrificial fluid) feed tube.
Figure 3B:
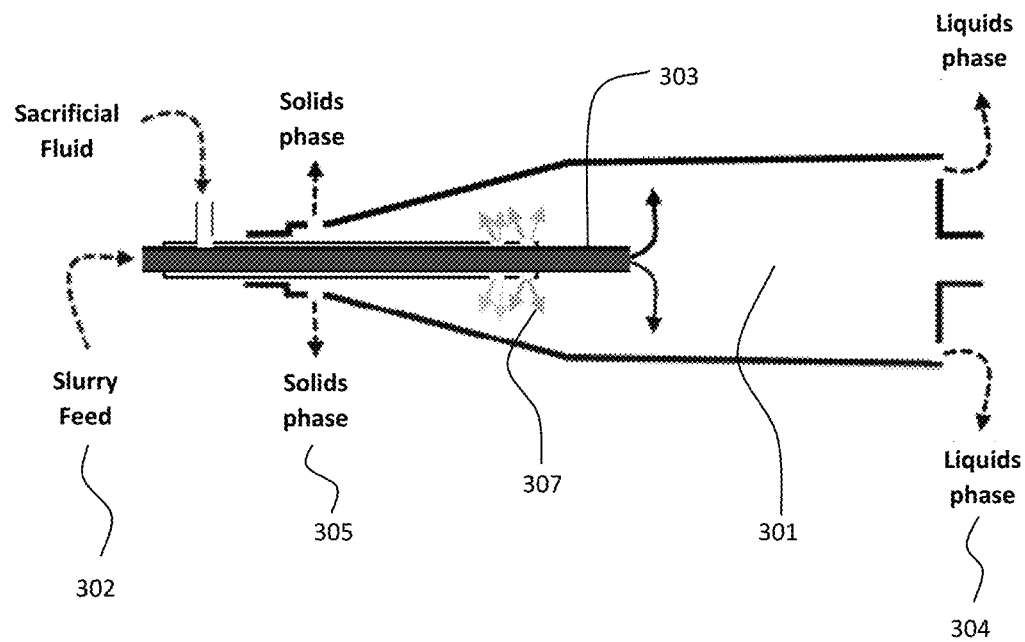

FIG. 3a has been included to illustrate the use of a horizontal decanter centrifuge to process a slurry of drilling mud (302) while generating a dryer cake, or a cake contaminated with less expensive, sacrificial fluid(s), by means of a secondary feed tube (308) with at least one outlet, wherein the sacrificial fluid exits the secondary feed tube via the at least one outlet. The illustration provides an overview of how drilling mud can be fed into the bowl section (301) by way of the primary feed tube (303), and subsequently where the separate phases exit the bowl section (304 & 305). The illustration depicts the primary feed tube (303) entering through one end of the hollow shaft of the bowl section, nearer the liquids phase (304) outlet. Also depicted is the use of the secondary sacrificial fluid feed tube (308), opposite the primary feed tube (303). While not shown, the primary feed tube and secondary feed tube can be arranged to enter through either end of the bowl section, provided the arrangement of the tubes does not allow for premature mixing between the slurry feed (302) and sacrificial feed (307), because the purpose of the sacrificial fluid is to displace the more expensive drilling mud, while simply mixing the sacrificial fluid with the drilling mud would simply create more drilling mud. The creation of more drilling mud is typically accomplished by blending fresh base fluid and additives into the drilling mud, which is done to combat down-hole formation losses or losses as a result of the limited effectiveness of solids control equipment at surface, or dilution of drilled solids. FIG. 3b illustrates a single, dual purpose primary and secondary feed tube design in one, to facilitate delivery of the drilling mud slurry (into the bowl) and sacrificial fluid (onto the cake).

Figure 3C:
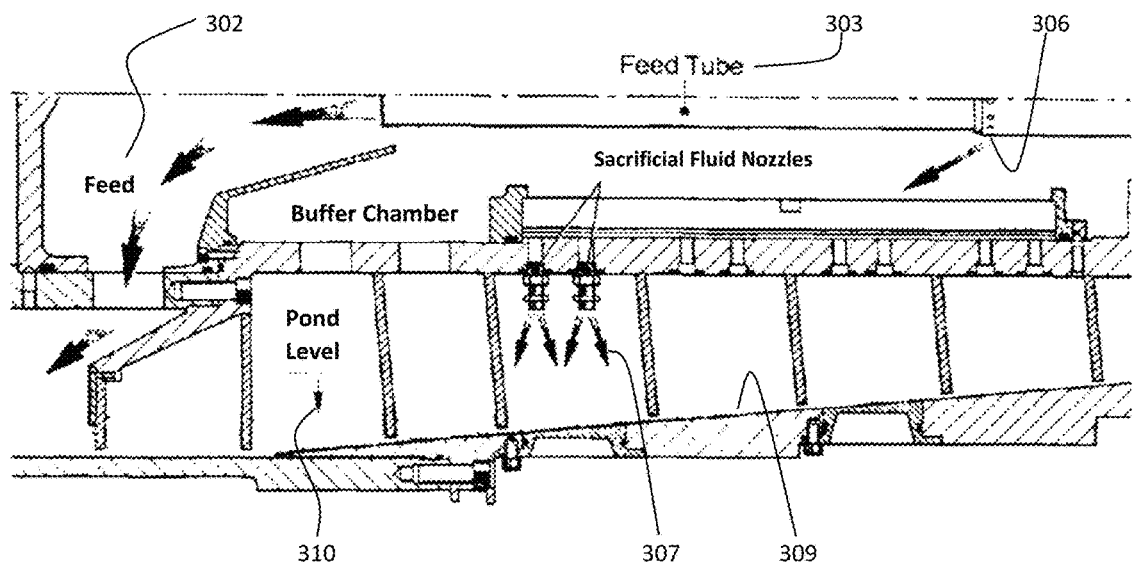
Figure 3D:
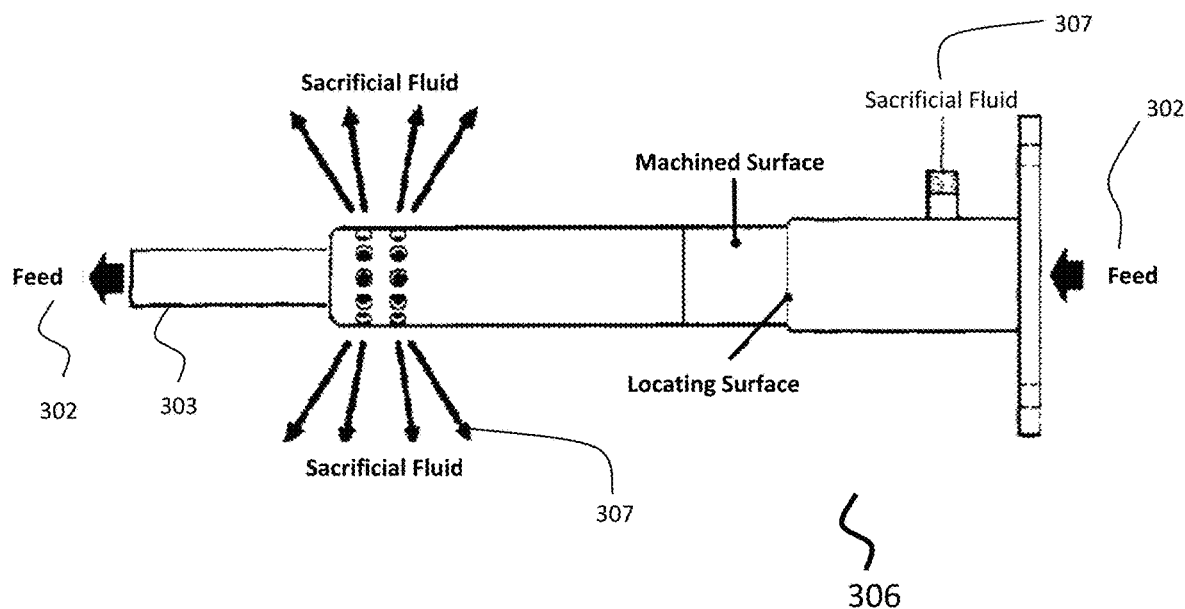

FIGS. 3c and 3d detail the design of a combination primary feed tube and secondary sacrificial feed tube, in one. Specifically, FIG. 3c is a cross-sectional illustration as described in section 2.3.6.4 of the Decanter Centrifuge Handbook which demonstrates the mechanics of a sacrificial fluid feed tube (306) along the tapered beach section (309) of a horizontal decanter centrifuge, wherein the at least one outlet is aligned with the tapered beach section along an axial direction of the horizontal decanter centrifuge. FIG. 3d is an illustration described in section 2.3.8.2 of the Decanter Centrifuge Handbook which demonstrates a design of the feed tube, where the design incorporates the secondary sacrificial fluid (307) delivery system with the primary drilling mud slurry feed (302). The sacrificial fluid (307) would be the fluids described herein.

While not illustrated separately, this combination primary feed tube and secondary sacrificial feed tube could also be arranged to enter the hollow shaft of the bowl section, nearer the liquids phase outlet (304). However, such a design should result in the feed tube being built of heavier materials to combat the harmonic vibration of the longer feed tube, which is a common cause of feed tube failure. Further, the greater thickness of materials would reduce the inner working diameter of the process feed tube, likely resulting in a higher propensity for plugging of the feed tube. The lower cost sacrificial fluid is intended to permeate the porosity and voidage of the cake and displace or wash the more expensive drilling mud back into the pond (310).

The use of a horizontal decanter centrifuge in an oilfield application is also known to cause misting of the liquids phase that is pushed or pulled from the casket section of the decanter centrifuge (by air flow, induced by the bowl rotation), nearer the solids chute. The action of liquids misting can lead to unnecessary drilling fluid loss, health, safety or environmental consequences due to inhalation (and subsequent crossing of an organic membrane barrier by the vapour/mist), vaporization (or gasification, meaning micron sized fluid particles which could be flammable become airborne), or contamination of the atmosphere or surrounding earthen material (caused by the re-condensation/settling of the vapour/mist on the ground or natural organics). This is because in addition to natural misting that can occur while operating a horizontal decanter centrifuge, the stresses imposed by the high gravity forces on the drilling mud slurry can cause lighter volatiles to separate from the drilling mud slurry, for example BTEX. Further, it is expected that the embodiment described herein could facilitate additional undesired misting because the sacrificial fluid could become "atomized" by the rotating components of the scroll section, prior to coming in contact with the cake.

To mitigate or eliminate the amount misting during typical drilling mud centrifugation, or mitigate or eliminate misting of volatiles (when present in the drilling mud slurry), or the additional misting caused by adding sacrificial fluid to drilling mud centrifugation, would be to incorporate a semi-sealed conveyor to the solids outlet and/or, install a vapour/mist recovery system to harvest the vapour/mist for reuse.

Figure 4A:
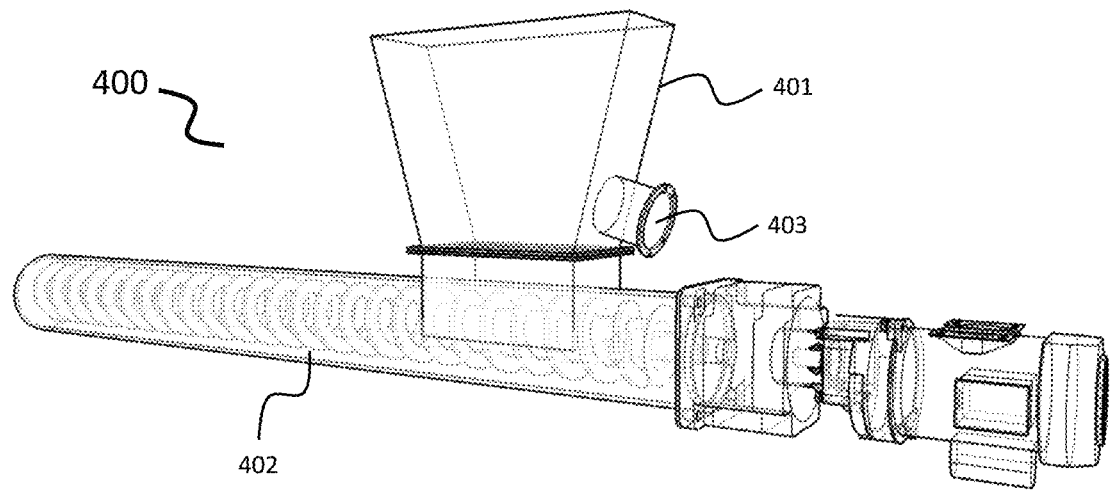
FIG. 4A is an internal view of a cake auger for conveyance and a vapour/mist exhaust port incorporated into the auger conveyor.
Figure 4B:
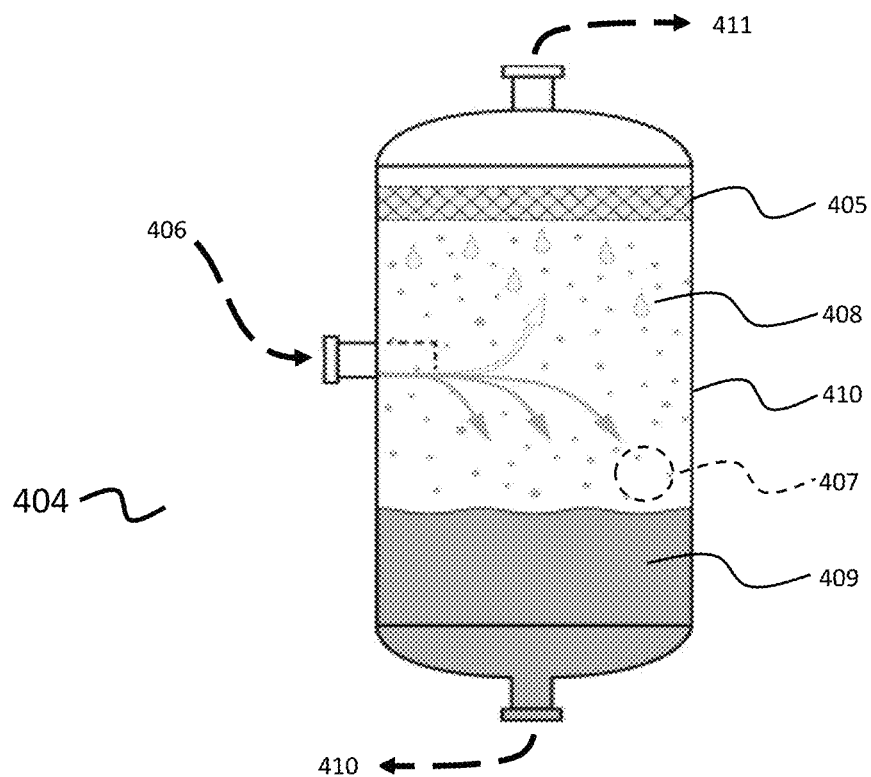
FIG. 4B is an internal view of a vapour/mist recovery unit with mist pad and sacrificial fluid storage tank.

FIGS. 4a and 4b illustrate components of an embodiment of a vapour/mist prevention or recovery system, which can be used in conjunction of the sacrificial fluid/expensive fluid recovery process or independent from the sacrificial fluid/expensive fluid recovery process, to enhance the safe operation of centrifuging drilling mud.

Specifically. FIG. 4a illustrates an embodiment of a conveyor, for example an auger conveyor (400), which is close coupled to the solids outlet of a horizontal decanter (not shown). The solids, mist and turbulent air flow generated during the operation of the embodiment is contained within the inlet hopper (401) of the conveyor system (400). An auger (402) conveys the solids phase away from the inlet hopper (401) area while the turbulent air pushes the mist onto or into the auger section thereby causing the mist to move through the torturous path of the auger flights, allowing the mist to impact either the solids, the flights or both, so that the mist and turbulent air can be effectively calmed during the conveyance of the solids. In this configuration, the vapour outlet (403) would be plugged and the conveyor system (400) would effectively work as a mist/vapour elimination system by causing the vapour or mist to become attached to the solids phase during the process of conveyance, via the auger flighting (402). Alternatively, a vapour recovery system can be attached to the vapour outlet (403) so that the mist/vapour laden atmosphere can be drawn into the vapour outlet (403) by means of a flexible conduit or hose (not shown) and into the inlet (406) of a mist recovery tank (404). FIG. 4b illustrates the mist recovery tank wherein the atmosphere travels through a mist pad (405) and the mist laden air (407) is forced through a torturous path, impacting the mist pad, slowing, coalescing, and causing the liquids phase (408) to fall by gravity to the bottom of the knock-out tank (410) where the sacrificial fluid (409) is stored until removed via the outlet (410) by pump (not shown) to the process. The atmosphere containing less, if any mist at all, exits the knockout tank via the outlet (411) where a blower (412) pushes the atmosphere through either a carbon filter (413) and back (414) to the casket section of the decanter centrifuge (415) or directly through an exhaust tube conduit and back (416) to the casket section of the decanter centrifuge (415) to replenish the atmosphere drawn from the semi-sealed design of the solids conveyor (400). Ideally, the rate of air flow for airstreams 414 & 416 would be greater than 10 CFM (cubic feet per minute) and less than 1000 CFM, but could be greater or lesser as needed, to mitigate the conditions of adverse ambient cold, precipitation or windy weather conditions.

Figure 4C:
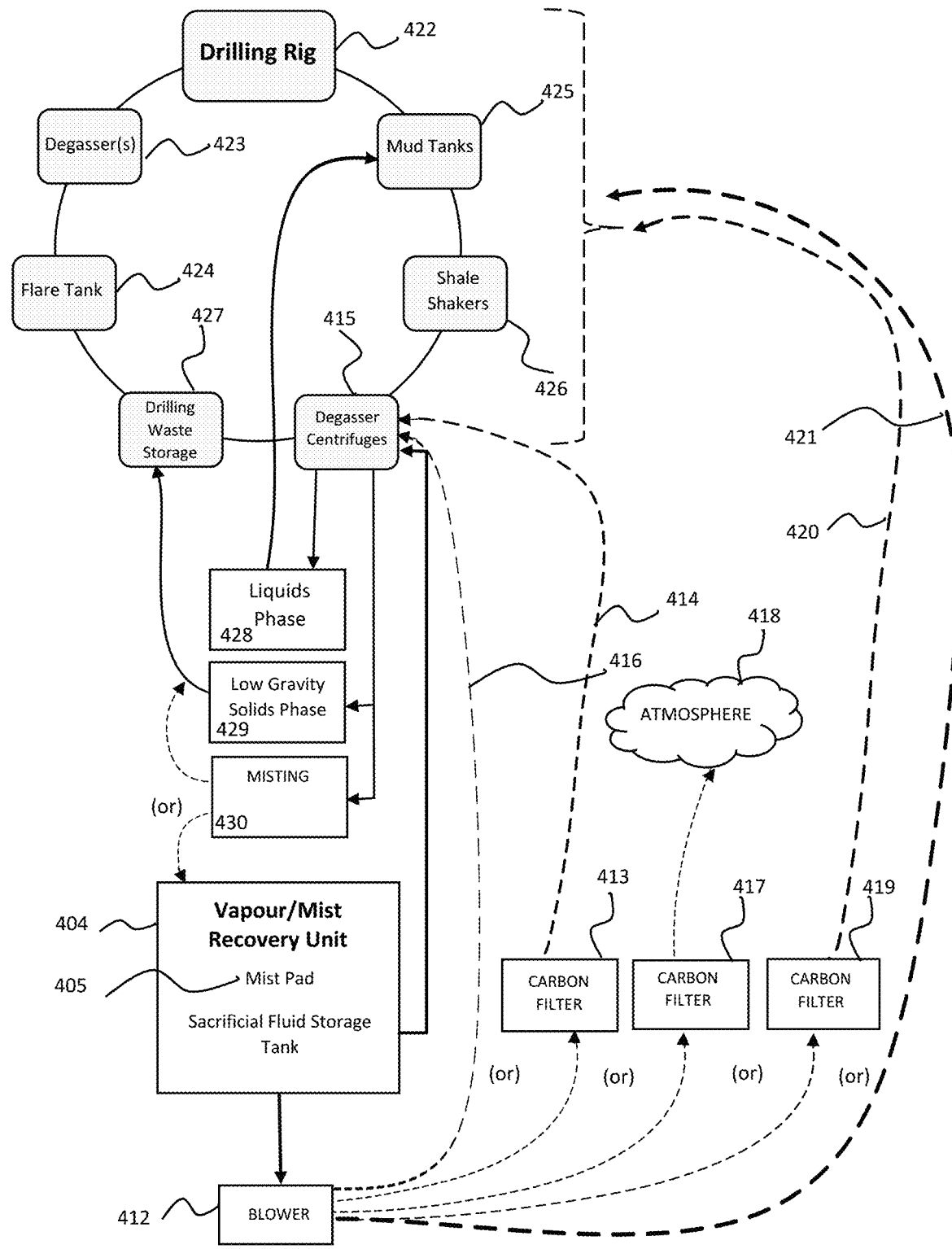
FIG. 4C is a flow chart to demonstrate the use of a horizontal decanter centrifuge with a sacrificial fluid feed tube to mitigate losses of expensive drilling mud, by adding a less expensive sacrificial fluid, and to illustrate the possible air flow design within the embodiment of a vapour/mist recovery unit.

FIG. 4c illustrates the liquids (428), solids (429), misting (430) and airflow movement through an embodiment by means of a block flow diagram, as well as the use of the embodiment of a vapour/mist recovery unit and return or exhaust of the de-misted air flow.

In an alternate arrangement of the vapour/mist recovery system, the mist laden atmosphere, nearer the solids outlet, is deliberately drawn into a conduit by the suction of a blower (412) or fan connected within the process, and moved through a mist pad (405) wherein the mist is forced through a torturous path, impacting the mist pad, slowing, coalescing, and causing the liquids phase to fall by gravity to a knock-out tank. The atmosphere containing less if any mist at all, is pushed through either a carbon filter (417) and back to a common outdoor atmosphere (418), or through a carbon filter (419) and back (420) to a suitable location on the drilling rig or supporting equipment of the drilling rig, or alternatively, from the vapour/mist recovery unit (404) through the blower (412) and directly back (421) to a suitable location on the drilling rig or supporting equipment of the drilling rig. Ideally, the rate of air flow should be greater than 100 CFM and less than 4000 CFM, but could be greater or lesser as needed, to combat adverse ambient cold, precipitation or windy weather conditions.

The addition of too much fluid can be mitigated by incorporating a vapour recovery system at or near the solids discharge outlet. This has the added benefit of recovering additional liquids phase losses due to misting under normal operation of a horizontal decanter centrifuge.

The use of this embodiment as described herein would have the added benefit of being an anti-plugging feature to the horizontal decanter centrifuge. By current design, the control panel of modern decanter centrifuges monitor amperage of the back drive and detect plugging of decanter either before the plugging occurs or while the plug has occurred and respond by stopping the feed conveyor/pump. Plugging of the decanter occurs when the scroll section is unable to convey the solids phase out of the bowl and the emergency torque overload protection disengages the back drive to permit it to freely turn with the bowl section. To continue pumping sacrificial fluid to the beach section while a blockage is occurring, or immediately after a blockage has occurred, would provide continued dilution of the slurry phase because no additional slurry phase is being added during the anti-plugging response from the control panel, and additional sacrificial fluids will facilitate continued lubrication between the bowl and scroll section.

Also shown in FIG. 4c are components of the drilling rig equipment which can be used in addition to or in place of a knockout tank including one or more of the following components; a flare tank (424), degasser vessel(s) (423), mud tank(s) (425), shale shaker(s) (426), and/or drilling waste storage equipment (427), for example to return the airstream to the atmosphere.

The hood described herein operates basically like that of the fan/hood system over a conventional stove in a home. If there's no need for a sacrificial fluid tank or knock out tank, a hood can be used which would act as a funnel to the side of the solids phase outlet of the centrifuge to pull the mist laden atmosphere into the funnel—which is connected to a mist pad and/or carbon filter, then passing through the blower and directly back to atmosphere or, through any of the following drilling rig components; a flare tank (424), degasser vessel(s) (423), mud tank(s) (425), shale shaker(s) (426), and/or drilling waste storage equipment (427), prior to diffusing back to atmosphere.

As described herein, the problems described and others in this area are addressed with the process and apparatus described herein. Thus, the scope of the process and apparatus shall include all modifications and variations that may fall within the scope of the attached claims. Other embodiments of the process and apparatus will be apparent to those skilled in the art from consideration of the specification and practice of the process and apparatus disclosed herein. It is intended that the specification and examples be considered as exemplary only, with a true scope and spirit of the process and apparatus being indicated by the following claims.

What is claimed is:

1. A process for liquid phase-solids phase recovery of drilling mud, comprising
   conveying the drilling mud as a slurry through a primary feed tube into a horizontal decanter centrifuge further having a secondary feed tube with at least one outlet and a bowl section containing a tapered beach section, wherein the at least one outlet is aligned with the tapered beach section along an axial direction of the horizontal decanter centrifuge,
   separating the slurry into a liquids phase containing less solids phase and a solids phase containing less liquids phase, and
   adding a sacrificial fluid through the secondary feed tube causing the sacrificial fluid to exit the secondary feed tube via the at least one outlet and first contact the solids phase containing less liquids phase along the tapered beach section of the bowl section causing the sacrificial fluid to permeate the solids phase and displace the liquid phase of the drilling mud, ejecting the solids phase from the decanter centrifuge,
   resulting in enhanced separation and recovery of the drilling mud from the solid phase of the drilling mud prior to ejecting the solids phase from the decanter centrifuge.

2. The process of claim 1, wherein the amount of sacrificial fluid added to the solids phase is greater than the sacrificial fluid addition calculation obtained by dividing the bulk density into the density of the processed drill cuttings and adding the volumetric values of absorption and porosity, multiplied by the production rate of processed drill cuttings.

3. The process of claim 1, wherein amount of the sacrificial fluid added to the solids phase is less than the sacrificial fluid addition calculation obtained by dividing the bulk density into the density of the processed drill cuttings and adding the volumetric values of absorption and porosity, multiplied by the production rate of processed drill cuttings.

4. The process of claim 1, wherein amount of the sacrificial fluid added to the solids phase is equal to the sacrificial fluid addition calculation obtained by dividing the bulk density into the density of the processed drill cuttings and adding the volumetric values of absorption and porosity, multiplied by the production rate of processed drill cuttings.

5. The process of claim 1, wherein the sacrificial fluid prevents plugging of the centrifuge or aids in unplugging the centrifuge after it has become plugged.

6. The process of claim 1 wherein the sacrificial fluid has a flashpoint of at least 61° C.

7. The process of claim 1 wherein the mixture of drilling mud and sacrificial fluid have a combined flashpoint of at least 65° C.

8. The process of claim 1, including discharging the solids phase from the horizontal decanter centrifuge and wherein the solids phase discharged from the centrifuge contains a liquid phase consisting essentially of the sacrificial fluid.

9. The process of claim 1, including discharging the solids phase from the horizontal decanter centrifuge, and wherein the solids phase discharged from the centrifuge contains a liquid phase comprising less than 50% by volume of the sacrificial fluid.

10. The process of claim 1 including discharging the solids phase from the horizontal decanter centrifuge and wherein the solids phase discharged from the horizontal decanter centrifuge contains a liquid phase comprising less than 30% by volume of the sacrificial fluid.

11. The process of claim 1 including discharging the solids phase from the horizontal decanter centrifuge and wherein the solids phase discharged from the horizontal decanter centrifuge comprises a liquid phase containing the sacrificial fluid.

12. The process of claim 1, including pre-treating and/or post-treating the drilling mud, separated liquid phase and/or solids phase, by solvent washing, additional decanter centrifuge separation, and/or solids drying.

13. The process of claim 1 wherein the sacrificial fluid comprises more than 50% by volume of the same ingredients used as the liquid phase of the drilling mud.

14. The process of claim 1 wherein the sacrificial fluid is heated to greater than 50° C. prior to the sacrificial fluid contacting the solids phase on the tapered beach section.

15. The process of claim 1, wherein the secondary feed tube is located along the outside of the primary feed tube.

16. The process of claim 1, wherein the secondary feed tube is located opposite the primary feed tube.

17. A process for liquid phase-solids phase recovery of drilling mud, comprising conveying the drilling mud as a slurry through a primary feed tube into a horizontal decanter centrifuge having a secondary feed tube and a bowl section containing a beach section, separating the slurry into a liquids phase containing less solids phase and a solids phase containing less liquids phase, and adding a sacrificial fluid through the secondary feed tube causing the sacrificial fluid to first contact the solids phase containing less liquids phase along the beach section of the bowl section causing the sacrificial fluid to permeate the solids phase and displace the liquid phase of the drilling mud, ejecting the solids phase from the decanter centrifuge, resulting in enhanced separation and recovery of the drilling mud from the solid phase of the drilling mud prior to ejecting the solids phase from the decanter centrifuge wherein the sacrificial fluid is water and is chemically altered to cause the sacrificial fluid to have a surface tension equal to or less than 60 Dyne/cm, prior to conveying the sacrificial fluid onto the solids phase.

* * * * *